United States Patent
Okayama

[19]
[11] Patent Number: 6,075,349
[45] Date of Patent: Jun. 13, 2000

[54] COMPENSATION DEVICE AND POWER TRANSMISSION SYSTEM USING A COMPENSATION DEVICE

[75] Inventor: Hideo Okayama, Tokyo, Japan

[73] Assignee: Mitsubishi Denki Kabushiki Kaisha, Tokyo, Japan

[21] Appl. No.: 09/189,988

[22] Filed: Nov. 12, 1998

[30] Foreign Application Priority Data

Apr. 15, 1998 [EP] European Pat. Off. .............. 98106780

[51] Int. Cl.⁷ ...................................................... G05F 1/70
[52] U.S. Cl. .......................................... 323/207; 323/210
[58] Field of Search .................................... 323/205, 707, 323/208, 209, 210, 211

[56] References Cited

U.S. PATENT DOCUMENTS

| | | | |
|---|---|---|---|
| 4,219,856 | 8/1980 | Danfors et al. | 361/15 |
| 4,434,376 | 2/1984 | Hingorani | 323/210 |
| 4,999,565 | 3/1991 | Nilsson | 323/210 |
| 5,032,738 | 7/1991 | Vithayathil | 323/211 |
| 5,227,713 | 7/1993 | Bowler et al. | 323/211 |
| 5,367,197 | 11/1994 | Klerfors | 323/211 |
| 5,384,528 | 1/1995 | Leowald et al. | 323/209 |
| 5,621,305 | 4/1997 | Clark et al. | 323/210 |
| 5,652,504 | 7/1997 | Bangerter | 323/211 |
| 5,942,880 | 8/1999 | Akamatsu et al. | 323/210 |

FOREIGN PATENT DOCUMENTS

| | | | |
|---|---|---|---|
| 0692857 | 1/1996 | European Pat. Off. | H02J 3/18 |
| 2742599 | 6/1997 | France | H02H 7/12 |
| 62-233452 | 3/1988 | Japan | F02D 43/00 |
| WO 94/24622 | 10/1994 | WIPO | G05F 1/12 |

OTHER PUBLICATIONS

Stemmler et al., "Transformerless Reactive Series Compensators With Voltage Source Inverters", Proceedings of PCC Nagaoka '97, IEEE May 1997, pp. 197–202.

*Primary Examiner*—Jeffrey Sterrett
*Attorney, Agent, or Firm*—Leydig, Voit & Mayer

[57] ABSTRACT

The invention relates to a compensator device connected in series to power transmission lines and including at least one compensator unit with a transformerless reactive series compensator. The compensator unit includes an AC switch coupled to output terminals of the series compensator. Furthermore, the invention also relates to such a compensation device including multiple compensator units connected in series at the output terminals and a continuous operation control for selectively controlling the series-connected compensators. With such a compensation device, the transformerless reactive series compensator can be prevented, by the AC switch, from conducting an overcurrent and the main components of the compensation device can be compact.

10 Claims, 12 Drawing Sheets

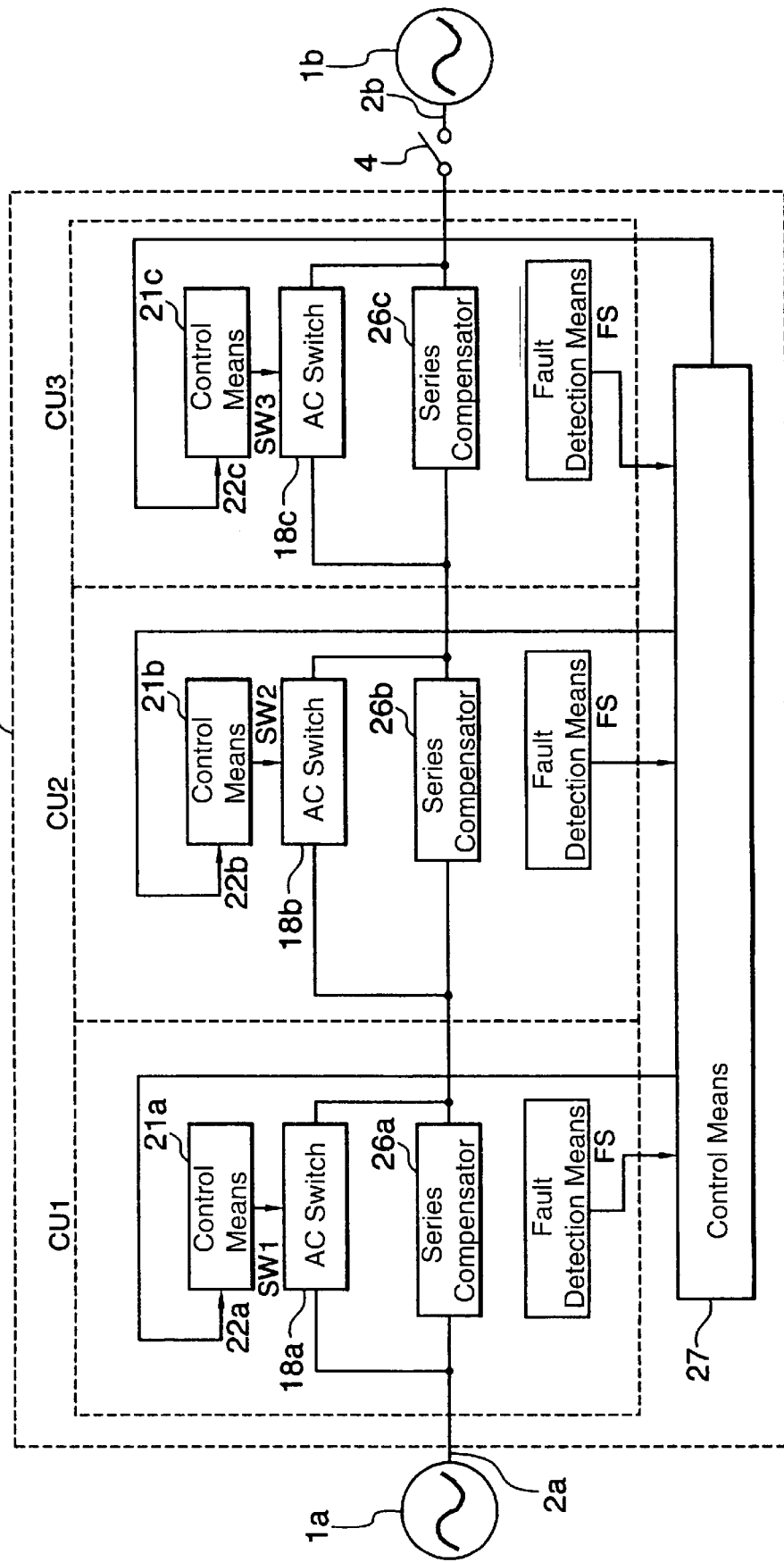

COMPENSATION DEVICE AND POWER TRANSMISSION SYSTEM USING A COMPENSATION DEVICE

BACKGROUND OF THE INVENTION

1. Field of the Invention

The invention relates to a compensation device and a power transmission system using such a compensation device. In particular, the invention relates to such compensation devices which comprise a transformerless reactive series compensator.

2. Description of the Related Art

Compensation devices are typically used in power transmission systems in order to increase the power transmission capacity and to make it more stable. Normally a power transmission line has a circuit breaker. When the circuit breaker is opened or closed, overcurrents and overvoltages are generated. In particular, in power transmission systems having a high power and a long power transmission line, such overvoltages and overcurrents are generated due to the parasitic inductances and capacitances of the power transmission line. Moreover, they can damage the compensation devices and the AC power systems connected to the power transmission lines.

The invention in particular relates to the problem of how the compensation devices can be efficiently protected from these overcurrents and overvoltages.

Several different examples of compensation devices have been used in recent years to provide more stable and higher efficiency power transmission systems. Such power transmission systems are called flexible AC transmission systems (FACTS). Examples of semiconductor devices applied to the compensation devices are self arc-suppressing semiconductors like gate-turn-off thyristors (so-called GTOs) and gate-commutated-turn-off thyristors (so-called GCTs). They have been applied to power converters, namely inverters, and it is envisaged that their application will be more widespread in the future in order to realize more stable power transmission systems.

There is one compensation device, which comprises a transformerless reactive series compensator (so-called TL-RSC), used in the FACTS devices.

FIG. 9 shows a power transmission system comprising two AC power systems 1a, 1b coupled to each other through power transmission lines 2a, 2b and a circuit breaker 4 provided between the AC power system 1b and the power transmission line 2b. A compensation device 3 (comprising a compensator unit CU) is provided between the power transmission lines 2a, 2b to increase the power transmission capacity, and to make it more stable. The compensation device 3, CU can comprise a transformerless reactive series compensator TL-RSC. As shown in FIG. 9 the TL-RSC 3 is connected in series to the transmission lines 2a, 2b which connect the AC power systems 1a, 1b.

FIG. 10 shows a transformerless reactive series compensator TL-RSC 3 as known from the prior art reference "Transformerless Reactive Series Compensators with Voltage Source Inverters" of Proceedings of the Power Conversion Conference (PCC)—Nagaoka 1997, PP. 197–202. In FIG. 10, self arc-suppressing semiconductors are designated by 5a to 5d, free-wheeling diodes connected in anti-parallel with each of the self arc-suppressing semiconductors 5a to 5d are designated by 6a to 6d, a single-phase inverter which consists of the self arc-suppressing semiconductors 5a to 5d and the free-wheeling diodes 6a to 6d is designated by 7, a DC capacitor of the inverter is designated by 8, filter reactors are designated by 9a, 9b, a filter capacitor is designated by 10 and a filter circuit is designated by 11. The self arc-suppressing semiconductor 5a is separated from the free-wheeling diode 6a. In recent years, however, reverse-conducting self arc-suppressing semiconductors which integrate both functions of the self arc-suppressing semiconductor 5a and the free-wheeling diode 6a in the same package have been developed. When the reverse-conducting self arc-suppressing semiconductors are applied, the free-wheeling diodes 6a to 6d are not necessary in FIG. 10.

As shown in FIG. 10, the single-phase inverter 7 is connected in series and indirectly with the power transmission lines 2a, 2b without any transformer. That is, the inverter 7 is coupled to the power transmission lines 2a, 2b via the filter circuit 11 which is serially inserted in the lines 2a, 2b. The filter circuit 11 essentially suppresses harmonic distortions of the power transmission systems which result from the single-phase inverter 7 being operated by a pulse width modulation (so-called PWM) control. A separate configuration of the filter reactors 9a, 9b is not essential and it is possible to use only one of them.

The TL-RSC 3 has been proposed for new FACTs systems, but it has not been realized yet. So as to realize it, start-up and shut-down operations and/or another special operations of the TL-RSC 3 are very important problems to solve in particular, with respect to the size and weight of the individual components and with respect to the overcurrents and overvoltages occur when opening/closing the circuit breaker 4 as will be explained hereinafter.

Firstly, one case should be considered that the two AC power systems 1a, 1b are connected to the power transmission lines 2a, 2b. Here, it is assumed that the power transmission lines 2a, 2b mean long distance and high voltage power transmission lines on the order of 4000 kV and 500 km. As well-known, the power transmission lines 2a, 2b are described by at least an equivalent circuit as shown in FIG. 11. The equivalent circuit is expressed by a distributed constant circuit 15 which consists of internal resistances 12a, 12b, internal inductances 13a, 13b and a parasitic capacitance 14. Generally, the parasitic capacitance 14 exists mainly between the power transmission lines 2a, 2b and the earth GND. The power transmission lines 2a, 2b are freely divided by several distributed constant circuits 15.

When the power transmission lines 2a, 2b are connected by the circuit breaker 4, an overcurrent in much excess of the nominal current flows through the power transmission lines 2a, 2b. This disturbance of the power transmission lines 2a, 2b is a result of a resonance phenomenon generated by the internal inductances 13a, 13b and the parasitic capacitance 14. The disturbance is amplified if there is a large phase difference between both AC power systems 1a, 1b.

The overcurrent problem may be partially eliminated by using only the components shown in FIG. 10. In case the TL-RSC 3 is connected in series with the power transmission lines 2a, 2b, the overcurrent may pass through the single-phase inverter 7 or it may charge the filter capacitor 10. If the former case is allowed, the self arc-suppressing semiconductors 5a to 5d must turn off i.e., absorb the overcurrent, because the single-phase inverter 7 must protect the DC capacitor 8 from being charged to an overvoltage as a result of the overcurrent. Therefore, high current capacity self arc-suppressing semiconductors 5a to 5d are necessary. On the other hand, if the latter is allowed without turn-off operations of the self arc-suppressing semiconductors 5a to 5d, the overcurrent charges the filter capacitor 10 alternately.

The single-phase inverter 7 can operate as single-phase diode rectifier so that the overcharging voltage charges the DC capacitor 8. If the overvoltages must be suppressed, both capacitances of the filter capacitor 10 and the DC capacitor 8 must be increased, which results in components of large size. Thus in this prior art TL-RSC, large size components are necessary to solve the problem of overcurrents/overvoltages.

In addition, the above-mentioned prior art reference describes the conventional application and proposes that larger compensatable capacity can be achieved when using a multiple TL-RSC 16 which consists of several cascaded TL-RSC units CU1 to CU3 connected in series. Each of the TL-RSC units CU1 to CU3 has the same configuration as shown in FIG. 10. Here, another problem ocurrs when one of the TL-RSC units CU1 to CU3 has a failure in the single-phase inverter 7. The multiple TL-RSC 16 must not stop operating easily because it must not only compensate the power transmission systems but also basically transmit the power from one side of the AC power system 1*a* (1*b*) to the other side. Therefore, it is essential that the multiple TL-RSC 16 shown in FIG. 12 have a continuous operation function. This demands that even a single-phase inverter 7 having a failure must not stop operating completely, because all the TL-RSC units CU1 to CU3 are connected in series with the power transmission lines 2*a*, 2*b* and the single-phase inverter 7 having a failure must continue to pass the line current. Therefore, a solution is necessary in which all the self arc-suppressing semiconductors 5*a* to 5*d* maintain an on-state by shorting the output-terminals of the single-phase inverter 7 having a failure.

SUMMARY OF THE INVENTION

As mentioned above, there are some aspects to consider before a conventional TL-RSC 3 can be applied to the power transmission systems.

Firstly, larger capacity self arc-suppressing semiconductors 5*a* to 5*d* are necessary to permit an overcurrent passing through the single-phase inverter 7.

Secondly, larger capacitances of the filter capacitor 10 and/or the DC capacitor 8 are necessary to allow a large overcurrent to flow through the filter capacitor 10. These prerequisites require larger-size and more expensive components. Therefore, they make the TL-RSC 3 itself larger-size and more expensive.

Thirdly, the multiple TL-RSC 16 must have a continuous operation function, even if a single-phase inverter 7 inside of the TL-RSC units CU1, CU2, CU3 has a failure. However, as the conventional multiple TL-RSC 17 demands that the single-phase inverter 7 continues to pass the line current even when it fails, the single-phase inverter 7 having such a failure must not be separated from the power transmission lines 2*a*, 2*b*.

Consequently, the object of the present invention is to provide a compensation device and a power transmission system using such a compensation device, where no large size components are necessary in the transformerless reactive series compensator in order to handle the overcurrent and overvoltage therein.

This object is solved by a compensation device connected in series to power transmission lines and including at least one compensator unit with a transformerless reactive series compensator wherein said at least one compensator unit comprises a AC switch having a first and a second terminal coupled to the output terminals of the series compensator thereof.

Furthermore, this object is solved by a power transmission system comprising two AC power systems coupled to each other through power transmission lines and a circuit breaker inserted in the power transmission lines, wherein said power transmission system employs one or more compensation devices as stated above.

According to the invention, a controllable AC switch is coupled parallel to the transformerless reactive series compensator and the open and close state of the AC switch can be controlled. If after issuing a start-up command or a shutdown command the timing for controlling the AC switch is chosen correctly, this control enables that the overcurrent does not flow through the single-phase inverter but instead through the AC switch connected to the output-terminals of the transformerless reactive series compensator. The advantage of the novel TL-RSC according to the invention is that a rated current of the single-phase inverter can be reduced as an overcurrent, which flows through the power transmission lines can be bypassed from the single-phase inverter to the AC switch. Consequently, it is realized that the TL-RSC is smaller and more compact.

Preferably, said at least one compensator unit comprises an AC-switch control means for turning off the AC switch substantially at the zero-crossing of the line current flowing through the power transmission lines after a start-up command has been issued. The advantage is, that the transformerless reactive series compensator smoothly starts operating after the line current commutation from the AC switch to the single-phase inverter, since the AC switch is turned off (open state) at the zero-crossing of the line current.

Further preferably, the AC-switch control means turns on the AC switch (closed state) substantially at the zero-crossing of the AC switch voltage across the output terminals after a shut-down command has been issued. The advantage is, that the transformerless reactive series compensator smoothly stops operating after the line current commutation from the single-phase inverter to the AC switch, since the AC switch is turned on at the zero-crossing of the AC switch voltage. An advantage according to the two aforementioned embodiment is further that a rated current and/or a rated voltage of main components can be reduced as the smooth start-up and shut-down operation using the AC switch is possible without surplus current and voltage stresses. Consequently, it is realized that such a compensation device is smaller, more compact and cheaper.

Preferably, the AC switch consists of thyristors connected in anti-parallel. The advantage is, that the AC switch is automatically (i. e. not a controlled manner) turned off at the zero-crossing of the line current. An advantage is further that the current detector can be eliminated as the AC switch consists of thyristors. Consequently, it is realized that the TL-RSC is cheaper. Especially when the AC switch consists of light triggered thyristors, huge insulating transformers for gate circuits also can be eliminated. Consequently, it is realized that TL-RSC is smaller, more compact and cheaper.

Preferably, the compensation device comprises several compensator units connected in series at their output terminals as well as a control means for selectively controlling the respective transformerless reactive series compensators of the individual compensator units. Since in such a series connection each compensator unit comprises an AC switch coupled parallel to the transformerless reactive series compensator, the advantage is that the compensation device can keep on operating even when one of the single-phase inverters have a failure. In this case, the AC switch may be turned on by the control device such that the line current from the single-phase inverter having the failure is bypassed to the AC switch. Therefore, the AC switch of the single-phase inverter having a failure may preferably be selectively turned on by the control device. An advantage is thus that the multiple TL-RSC can continuously operate with no interruption as the continuous operation controller controls each TL-RSC unit equipped with the AC switch, even if some TL-RSC units have a failure. After repairing the fault TL-RSC units, the repaired TL-RSC units can re-control the line current once again. Consequently, it is realized that the multiple TL-RSC is more reliable.

Preferably, in a series connection of compensator units as for-mentioned, each of the compensator units comprises a fault detection means for detecting a failure or a normal operation of the respective series compensator and for sending a corresponding fault detection signal to the control means. The advantage is that the control means can now detect how many single-phase inverters or series compensators have failed and can correspondingly operate their AC switches.

Preferably, in the series connection of compensator units, the single-phase inverter comprises a DC capacitor and the continuous operation control means comprises a DC voltage command regulator for setting the voltage command of said DC capacitor. The advantage is that the DC voltage command regulator may adjust the voltage command over the DC capacitor in accordance with failure conditions, e.g. the DC voltage command regulator may set the voltage command of the DC capacitor in accordance with the number of failed transformerless reactive series compensator units.

In order to achieve the control of the DC capacitor voltage, the DC voltage command regulator preferably comprises a fault unit counter, a DC voltage command compensator, and an adder. A DC voltage control means adjusts the DC voltage across the DC capacitor of the single-phase inverter essentially in accordance with the number of failed compensator units. The voltage adjusted at the DC capacitor may be proportional to the number of failed compensator units. An advantage is further that the multiple TL-RSC can continuously operate with no reduction of the compensatable capacity as the DC voltage control means adjusts the voltage of the DC capacitor, even if some TL-RSC units have a failure. Consequently, it is realized that the multiple TL-RSC is more reliable.

Preferably, for adjusting the substantial zero-crossing of the current and the substantial zero-crossing of the voltage, the compensator unit may each comprise a current detector and a voltage detector.

Further advantageous embodiments and improvements of the invention are listed in the dependent claims. Hereinafter, the invention will be described with reference to its embodiments and with reference to the attached drawings.

BRIEF DESCRIPTION OF THE DRAWINGS

FIG. 7a shows several compensator units connected in series, according to the invention;

FIG. 7b shows details of the compensator device in FIG. 7a;

DETAILED DESCRIPTION OF THE PREFERRED EMBODIMENTS

Hereinafter, the best mode of the invention as presently perceived by the inventor is described with reference to the embodiments and with reference to the attached drawings. First, the principle of the invention is explained with references to FIGS. 1a, 1b and 1c.

Figure 1A:
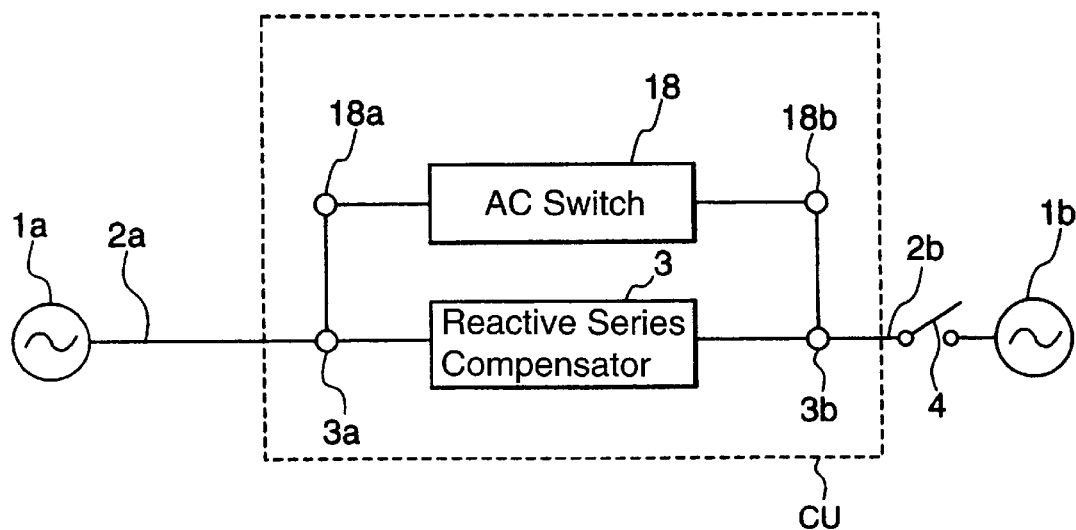
FIG. 1a shows a compensator device according to the invention.
Figure 10:
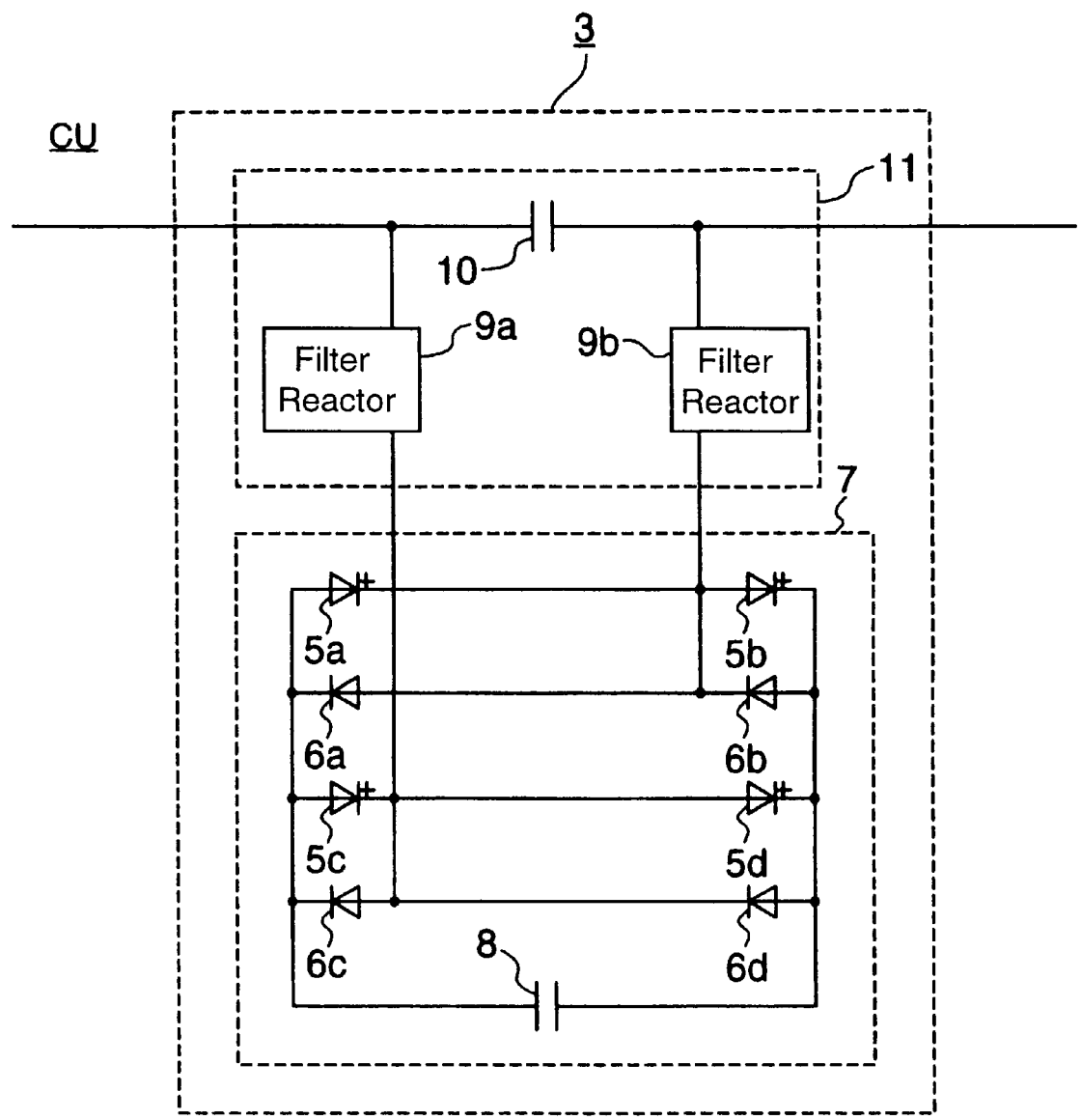
FIG. 10 shows a configuration of a transformerless reactive series compensator according to the prior art.

In FIG. 1a a compensation device connected in series to power transmission lines 2a, 2b includes at least one compensator unit CU. This compensator unit comprises a transformerless reactive series compensator 3 as already discussed with reference to FIG. 10. According to the invention the compensator unit comprises an AC switch 18. The first and second terminals 18a, 18b of the AC switch 18 are coupled to the output terminals 3a, 3b of the transformerless reactive series compensator 3. A circuit breaker between the AC power system 1b and the compensator unit CU is denoted with reference numeral 4. Although not shown in FIG. 1a, in real applications several circuit breakers may be connected in series to the transmission lines, for example at the sending end and at the receiving end of the transmission lines. According to the invention, the AC switch 18 may be a controllable switch or a self-controlling switch. The switch 18 is connected in parallel to the transformerless reactive series compensator (hereinafter also called TL-RSC) and has a start-up and shut-down operation process, such that no overcurrent passes through the single-phase inverter 7 in the TL-RSC. Essentially the AC switch turns off substantially at the zero-crossing of the line current flowing through the power transmission lines. Furthermore, the AC switch 18 turns on substantially at the zero-crossing of the AC switch voltage across the output terminals 3a, 3b as will be further described with references to FIG. 4 and FIG. 5 (FIG. 4: switch-off operation; FIG. 5: switch-on operation).

Figure 1B:
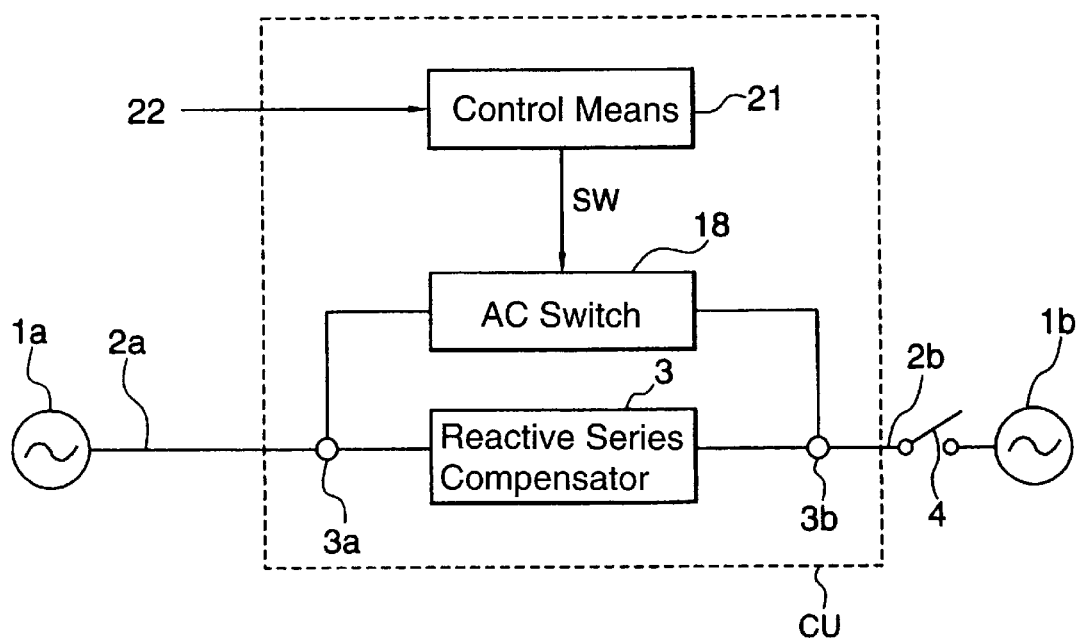
FIG. 1b shows a controller controlling the AC switch according to the invention.
Figure 3:
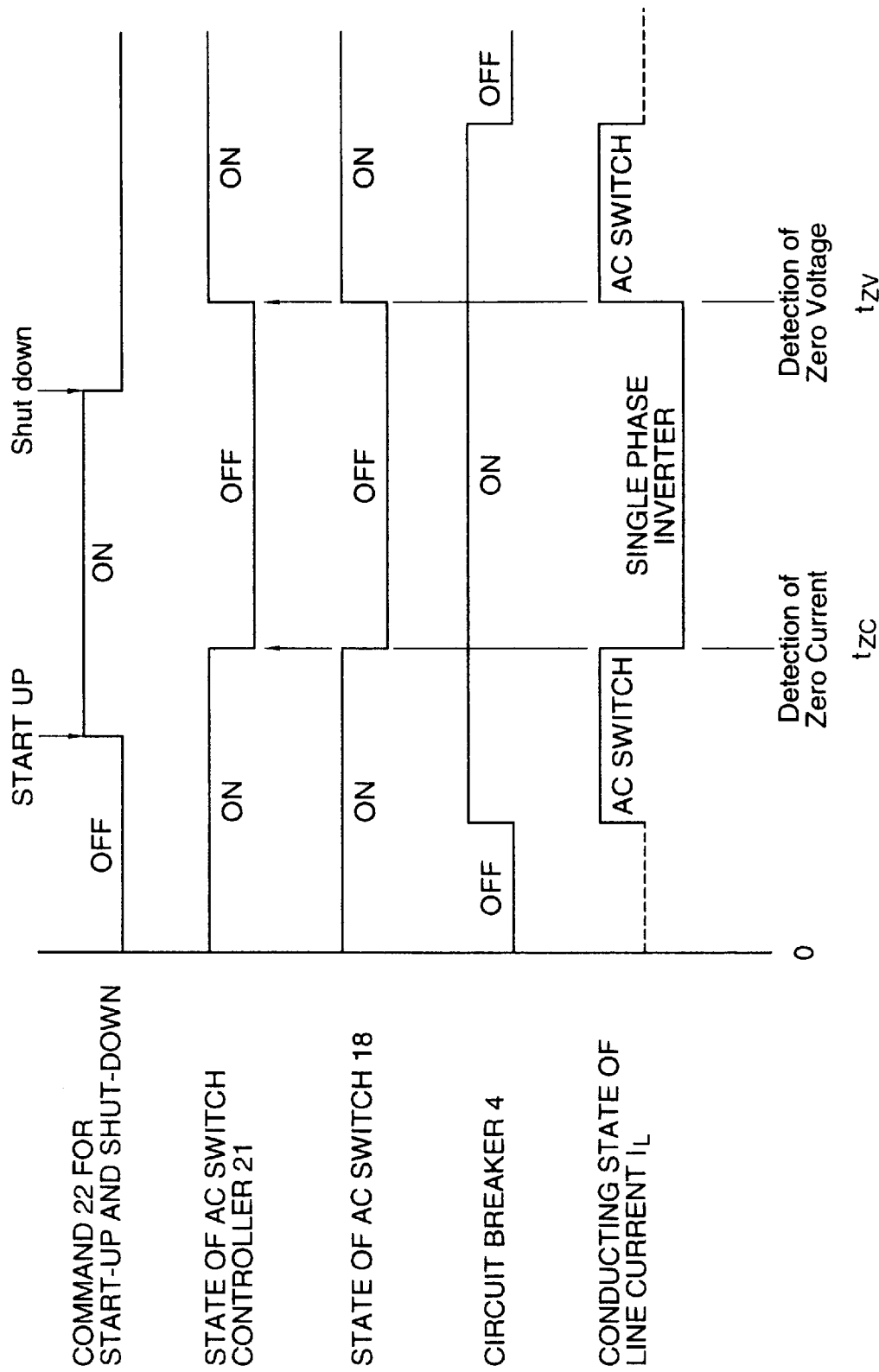
FIG. 3 shows the principle of start-up and shut-down processes of the compensator unit according to the invention.

FIG. 1b shows the same configuration as in FIG. 1a, however, in FIG. 1b the AC switch is not a self-controlling switch but the AC switch is controlled via a switching signal SW output by an AC-switch control means 21. The control means 21 receives the start-up command or shut-down command 22 from an external controller. FIG. 3 shows a principle time diagram of the operation of the circuit in FIG. 1b. It should be noted that the provision of the AC-switch control means 21 is optional and can be omitted in case that the AC switch is a self-controlling switch.

As is seen in FIG. 3, in the period O-tzc the AC switch is first held in an on-state, i.e. the AC switch is closed and connects the terminals 3a, 3b. Then a start-up command is issued and at the detection of the zero-crossing of the line current $I_L$ (after closing the circuit breaker 4) the state of the AC switch 18 changes to an off-condition, i.e., non-conduction state. This can either be done in a self-controlled manner by the AC switch 18 or in a controlled manner by means of sending the switching signal SW from the AC switch controller 21 exactly at the zero-crossing of the line current $I_L$. At the time t>tzc the line current passes through the single-phase inverter.

In a condition where the shut-down operation is required, the state of the AC switch 18 changes to a conducting state (ON) exactly at the detection of the zero-crossing of the voltage across the terminals 3a, 3b at the time t>tzv. Again, this may either be done in a self-controlled by the AC switch 18 or by issuing the appropriate switching signal SW by the AC switch control means 21.

The start-up operation and the shut-down operation as described in FIG. 3 for the inventive TL-RSC shown in FIGS. 1a, 1b allows to pass the overcurrent at the appropriate timing through the transformerless reactive series compensator 3 in such a manner that the capacitor 10 of the filter circuit 11 of the TL-RSC 3 is not overcharged.

First Embodiment

Figure 1C:
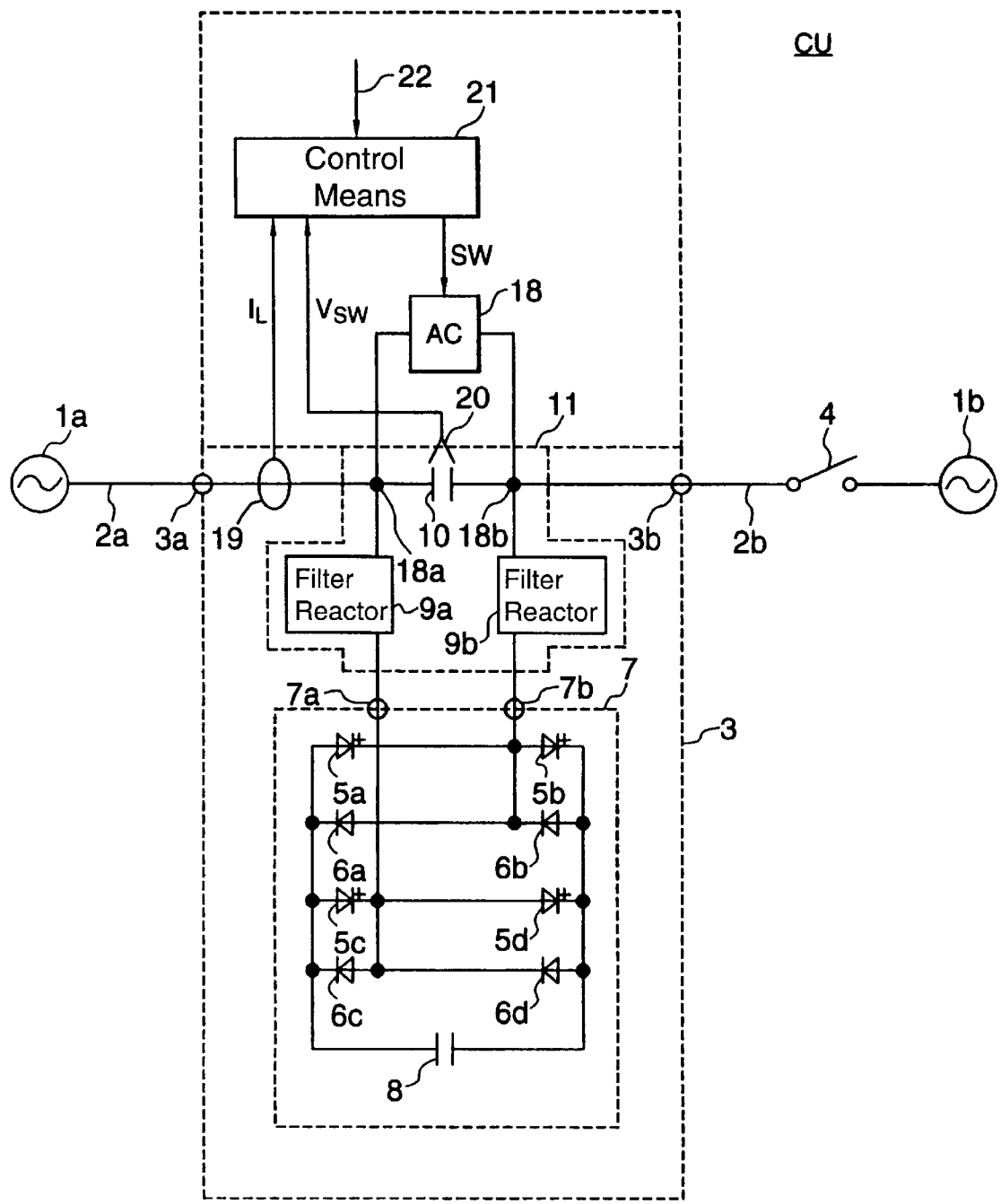
FIG. 1c shows a complete circuit diagram according to the invention.

FIG. 1c shows an embodiment of the TL-RSC 3 being part of a compensator unit CU as generally shown in FIGS. 1a, 1b. The compensator unit CU comprises a TL-RSC 3, the controller 21, the AC switch 18 and the filter circuit 11. Additionally, in this embodiment of the compensator unit CU a current detector 19 and a voltage detector 20 respectively detecting the line current $I_L$ and the AC switch voltage $V_{SW}$ are provided. In the embodiment in FIG. 1c, the AC switch is a controllable switch triggered by the switching signal SW output by the control means 21 in response to the detected current $I_L$ and the detected voltage $V_{SW}$. The configuration of the TL-RSC corresponds to the one shown and discussed with reference to FIG. 10.

As seen in the embodiment in FIG. 1c the AC switch is connected to the output-terminals 3a, 3b of TL-RSC 3 parallel to the filter capacitor 10. As explained, a detector of the line current is designated by 19, a detector of an AC switch 18 voltage is designated by 20 and the AC switch controller is designated by 21. A signal transmission line to transfer a start-up and shut-down command from an upper controller (not shown in FIGS. 1a, 1b, 1c) to the AC switch controller 21 is designated by 22.

The start-up and shut-down operation processes of the TL-RSC 3 shown in FIG. 1c are illustrated in FIG. 3. Here, it is assumed that the DC capacitor 8 of the single-phase inverter 7 is precharged to the nominal voltage from a pre-charging circuit not shown in FIG. 1c.

Figure 11:
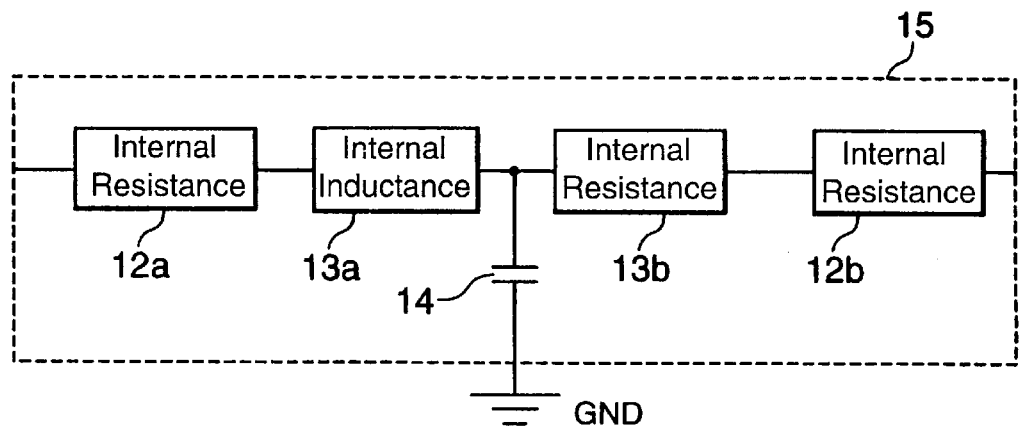
FIG. 11 shows an equivalent circuit of a power transmission line.
Figure 12:
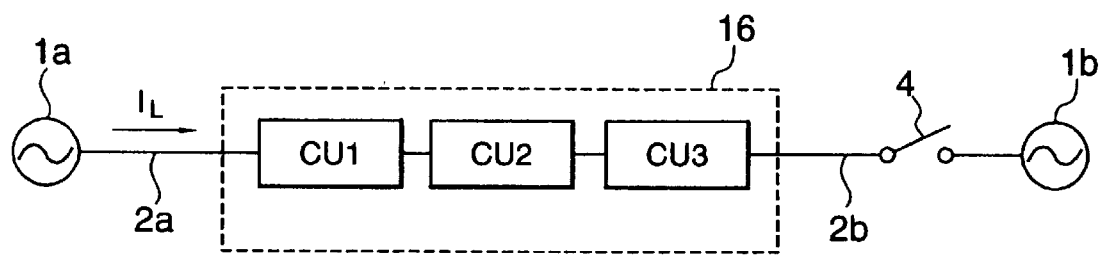
FIG. 12 shows a configuration of a conventional compensation device consisting of a series connection of several compensator units.

The start-up operation process is described with reference to FIG. 3 and FIG. 4. Before starting up, a shut-down command 22 is given to the AC switch controller 21 through the signal transmission line. Then, the AC switch controller 21 sends a turn-on signal to the AC switch 18. After the circuit breaker 4 is closed, the line current begins to flow through the power transmission lines 2a, 2b. The line current contains an overcurrent brought from the internal inductances 13a, 13b and the parasitic capacitance 14 shown in FIG. 11. The overcurrent does not flow through the single-phase inverter 7 but the AC switch 18. After the overcurrent is comparatively damped, a start-up command 22 of the TL-RSC 3 is given to the AC switch controller 21 through the signal transmission line. After that, the AC switch controller 21 begins detecting the zero-crossing of the line current $I_L$ on the basis of the current detector 19. At the same time when the zero-crossing is detected, the AC switch controller 21 sends a turn-off signal to the AC switch 18. Then, it is preferable that an output voltage of the single-phase inverter 7 is set to zero.

This is possible by shorting the output-terminals 3a, 3b of the TL-RSC 3 so that the self arc-suppressing semiconductors 5a and 5c (or alternately 5b and 5d) are turned on at the same time. When the AC switch 18 is turned off, the line current $I_L$ commutates from the AC switch 18 to the single-phase inverter 7. At last, the single-phase inverter 7 can control the line current according to a line current $I_L$ controller of TL-RSC 3 not shown in FIG. 1c.

Here, the reason why the AC switch 18 turns off (i. e. goes into its open state) at the zero-crossing of the line current $I_L$ is discussed. Generally, a current of an inductance is not only continuous but also uninterrupted. The same is true for the internal inductance 13a, 13b, too. If the AC switch 18 is turned off when the line current $I_L$ is not zero, the line current flowing through the power transmission lines 2a, 2b must change and flow to the single-phase inverter 7 through the filter reactors 9a, 9b. However, the current which passes toward the single-phase inverter 7 is limited by the filter reactors 9a, 9b which generate high induced electromotive forces due to high di/dt stresses. At the same time, in order to keep the current flow continuous, the line current charges the filter capacitor 10. These voltages due to the charging with the current represent input voltages at the single-phase inverter 7. Therefore, in order to make the voltage stresses minimum, the AC switch 18 must be turned off at the zero-crossing of the line current, since only then there will not be an additional charging and thus no additional voltages input to the single-phase inverter 7.

Normally in real applications, however, it is too difficult to find the exact zero crossing of the line current because an output of the current detector 19 contains noise, more or less. Consequently, preferably the near-by zero condition is found by setting a threshold level. From the standpoint that the line current $I_L$ has a bypass circuit to maintain continuity, it is preferable that the output-terminals 7a, 7b of the single-phase inverter 7 be shorted before the AC switch 18 is turned off.

The shut-down operation process is described with reference to FIG. 3 and FIG. 5. The shut-down command 22 of the TL-RSC 3 is given to the AC switch controller 21 through the signal transmission line. After that, the AC switch controller 21 begins detecting the zero-crossing of the AC switch 18 voltage on the basis of the voltage detector 20. At the same time when the zero crossing is detected, the AC switch controller 21 sends the turn-on signal SW to the AC switch 18. Then, it is preferable that the output voltage of the single-phase inverter 7 be set to zero. This is possible by shorting the output-terminals 3a, 3b of the TL-RSC 3 so that the self arc-suppressing semiconductors 5a and 5c (or alternately 5b and 5d) are turned on at the same time. When the AC switch 18 is turned on, the line current $I_L$ commutates from the single-phase inverter 7 to the AC switch 18. Residual energy inside of the filter reactors 9a, 9b is consumed by circulating through the single-phase inverter 7 and the AC switch 18. At last, the single-phase inverter 7 can be separated from the power transmission lines 2a, 2b. Then the circuit breaker 4 can be opened whenever that is expected.

The reason why the AC switch should be turned on at the zero crossing of the AC switch 18 voltage is specifically discussed with reference to FIG. 5. If the AC switch 18 is turned on when the voltage is not zero, the filter capacitor 10 must be shorted and a large discharging current flows from the filter capacitor 10 to the AC switch 18. The discharging current is amplified by increasing the impressed voltage across the AC switch 18 and this means an additional current stress for the AC switch 18. Therefore, in order to make the current stress minimum, the AC switch 18 must be turned on at the zero crossing of the impressed voltage. Normally in real applications, however, it is too difficult to find the exact zero crossing of the impressed voltage because an output of the voltage detector 20 contains noise. Consequently, preferably a near zero condition is found by setting a threshold level. From the stand point that the impressed voltage is decreased in advance, it is preferable that the output-terminals 7a, 7b of the single-phase inverter 7 be shorted before the AC switch 18 is turned on.

Figure 4:
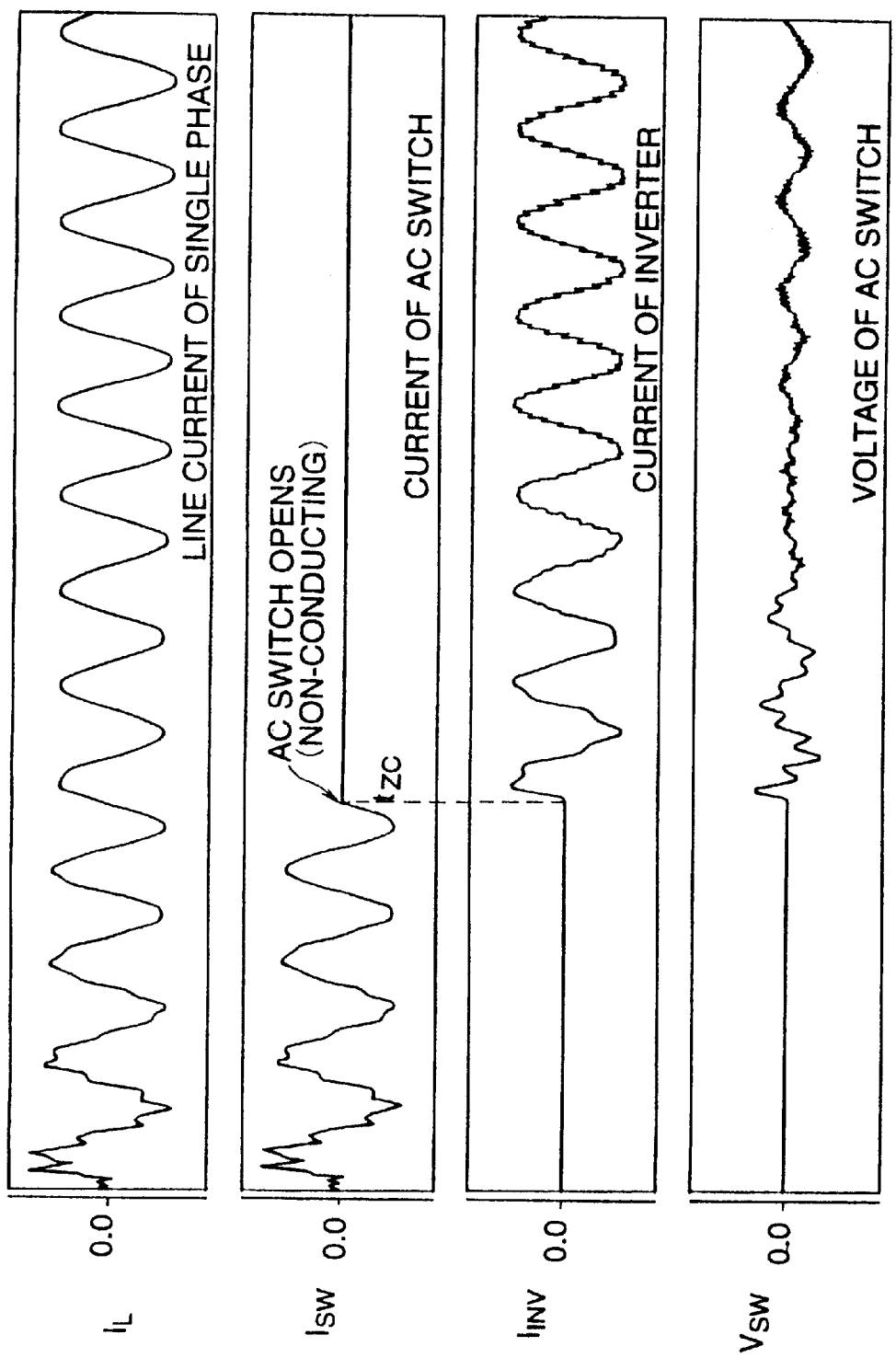
FIG. 4 shows details of the start-up operation of the compensator unit of FIG. 1c.
Figure 5:
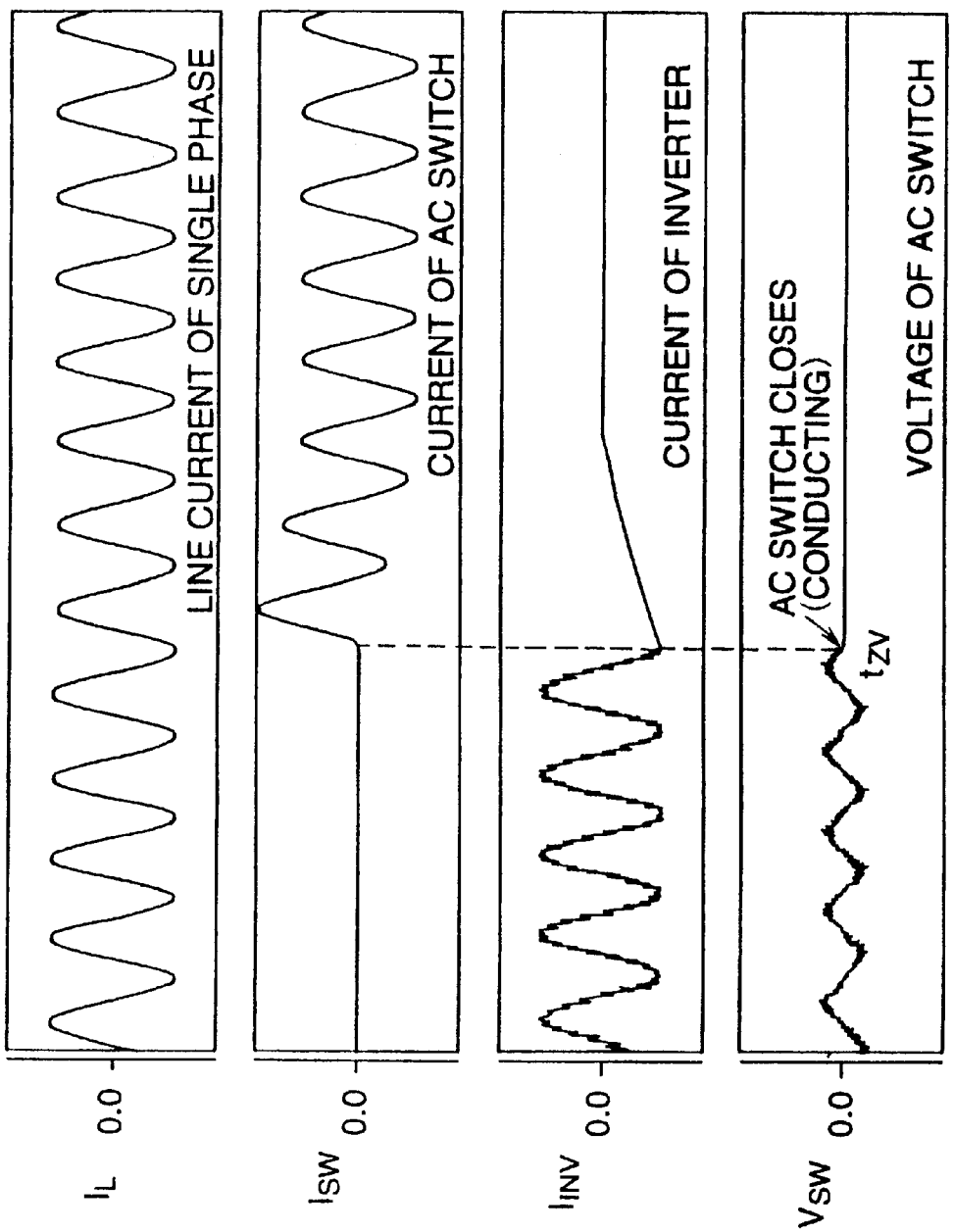
FIG. 5 shows details of the shut-down operation of the compensator unit of FIG. 1c.

FIG. 4 shows the start-up operation, and FIG. 5 shows the shut-down operation. From the top in each figure, the first waveform is the line current waveform $I_L$, the second one is the AC switch 18 current waveform $I_{SW}$, the third one is the single-phase inverter 7 current waveform $I_{INV}$, and the fourth one is the AC switch 18 voltage waveform $V_{SW}$. As shown in FIG. 4 at starting up, the AC switch 18 is turned off (open state) at the zero-crossing of the line current $I_L$ and the line current commutates from the AC switch 18 to the single-phase inverter 7. Then, no overcurrent is presented in the single-phase inverter 7 current waveform and no overvoltage is presented in the AC switch 18 voltage waveform. Further as shown in FIG. 5, at shutting down, the AC switch 18 is turned on at the zero crossing of the AC switch 18 voltage $V_{SW}$. Then, no overcurrent exists in the AC switch 18 current waveform $I_{SW}$. Accordingly, smooth start-up and shut-down of the TL-RSC 3 can be realized by this embodiment of the invention.

Second Embodiment

Figure 2:
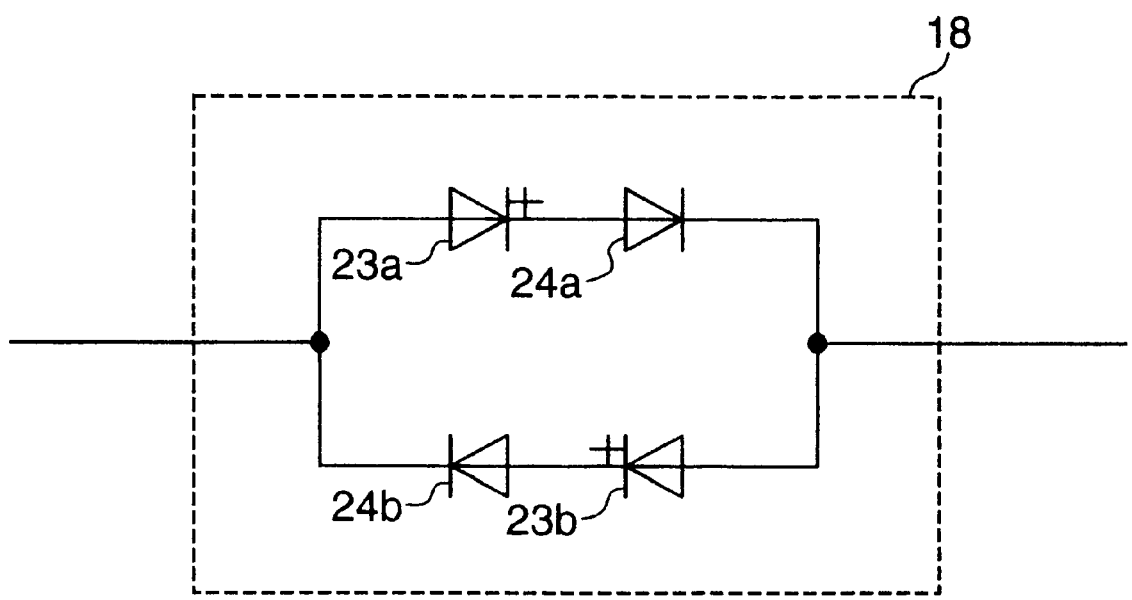
FIG. 2 shows an embodiment of an AC switch that consists of self arc-suppresslng semiconductors and of diodes.

FIG. 2 shows an embodiment of the AC switch 18 which consists of self arc-suppressing semiconductors 23a, 23b. Generally, a large capacity self arc-suppressing semiconductor a has no high reverse-voltage-blocking characteristic. However, a high AC voltage is impressed across the AC switch 18. On the one hand, as shown in FIG. 2, because of the auxiliary diodes 24a, 24b connected in series with the self arc-suppressing semiconductors 23a, 23b, the AC switch 18 can have a high reverse-voltage-blocking characteristic. On the other hand, an AC current should be passed through the AC switch 18. Then, as shown in FIG. 2, one series-connected block consisting of the self arc-suppressing semiconductor 23a and the auxiliary diode 24a is connected in anti-parallel to the other block that consists of the self arc-suppressing semiconductor 23b and the auxiliary diode 24b, such that the AC current can be passed.

Third Embodiment

In case the AC switch 18 consists of the self arc-suppressing semiconductors 23a, 23b and the auxiliary diodes 24a, 24b as shown in FIG. 2, the current detector 19 and the voltage detector 20 are necessary.

Figure 6:
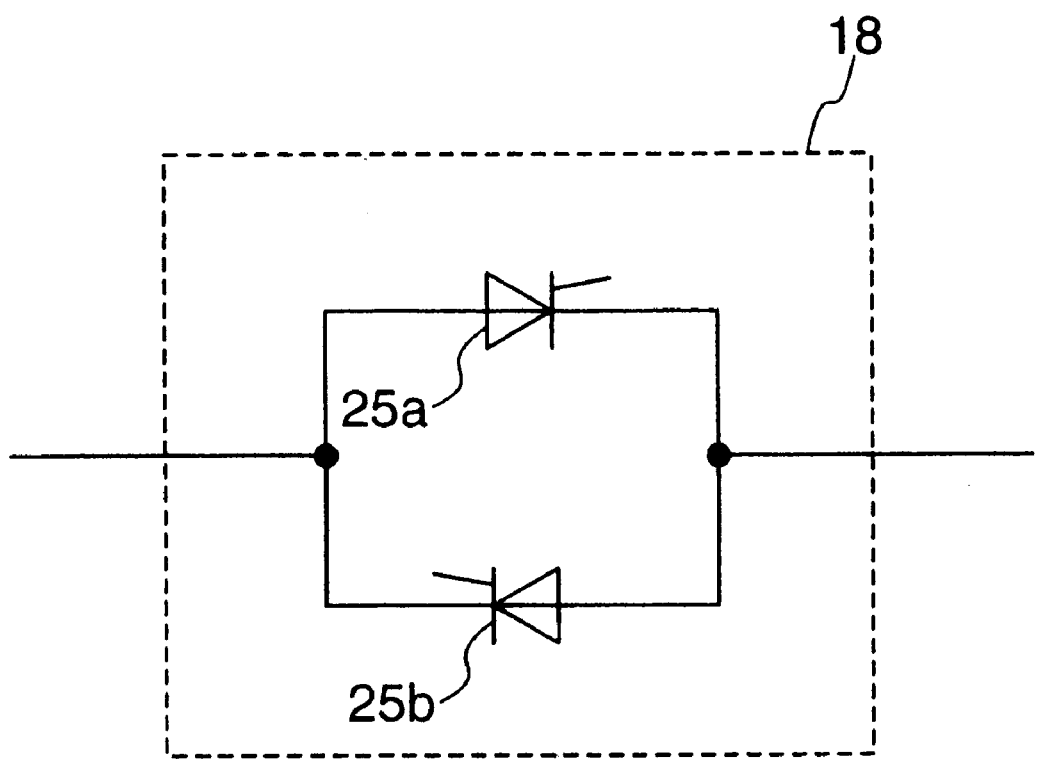
FIG. 6 shows an embodiment of an AC switch that consists of thyristors, according to the invention.

But another embodiment of the compensator unit CU according to the invention does not require a current detector 19. FIG. 6 shows an embodiment of AC switch 18 consisting of two thyristors 25a, 25b connected in anti-parallel. Generally, a thyristor can select a turn-on-time, but it can not select a turn-off-time. If the turn-on signal of the thyristor is removed when the thyristor is conducting current, the thyristor is automatically turned off when the conducting current is equal to zero. When the AC switch controller 21 removes the turn-on signal, the AC switch 18 in FIG. 6 is automatically turned off at the zero crossing of the line current $I_L$ due to the turn-off characteristic of the thyristor. Then, in case the TL-RSC 3 is equipped with the AC switch 18 shown in FIG. 6, the current detector 19 is not necessary. This is what is referred to above as a self-controlled AC switch.

In addition, it is preferable that embodiments of the thyristors 25a, 25b are not electrically triggered thyristors but light triggered thyristors. The reason is that the TL-RSC 3 must be floated from the earth potential GND during normal operation and gate circuits of the thyristors 25a, 25b also must be insulated from the earth potential. On one hand, if using the electrically triggered thyristors, huge isolating transformers are necessary to isolating the gate circuits from the earth potential GND. On the other hand, if using the light triggered thyristors, the isolating transformers can be eliminated.

Fourth Embodiment

FIG. 7a shows another embodiment of a compensator device according to the invention comprising a plurality of compensator units CU1, CU2, CU3 according to the invention. A control means 27 selectively controls the compensator units CU1, CU2, CU3 by means of sending a selective command signal 22a, 22b, 22c to the respective control means 21a, 21b, 21c. Each compensator unit CU1, CU2, CU3 comprises a fault detection means FDM for detecting a failure of a normal operation of a respective series compensator (TL-RSC) 26a, 26b, 26c. Each of the series compensators 26a, 26b, 26c has an AC switch 18a, 18b, 18c connected in parallel as generally indicated in FIG. 1c.

Generally, in FIG. 7a, the control means 27 sends a shut-down command 22a to the AC switch control means 21 of a compensator unit, e.g. CU1, whose fault detection means FDM has issued a fault detection signal FS, whereupon the AC switch control means 21 turns on the respective AC switch and then disconnects the respective single-phase inverter 7 from the output terminals 3a, 3b.

Figure 7B:
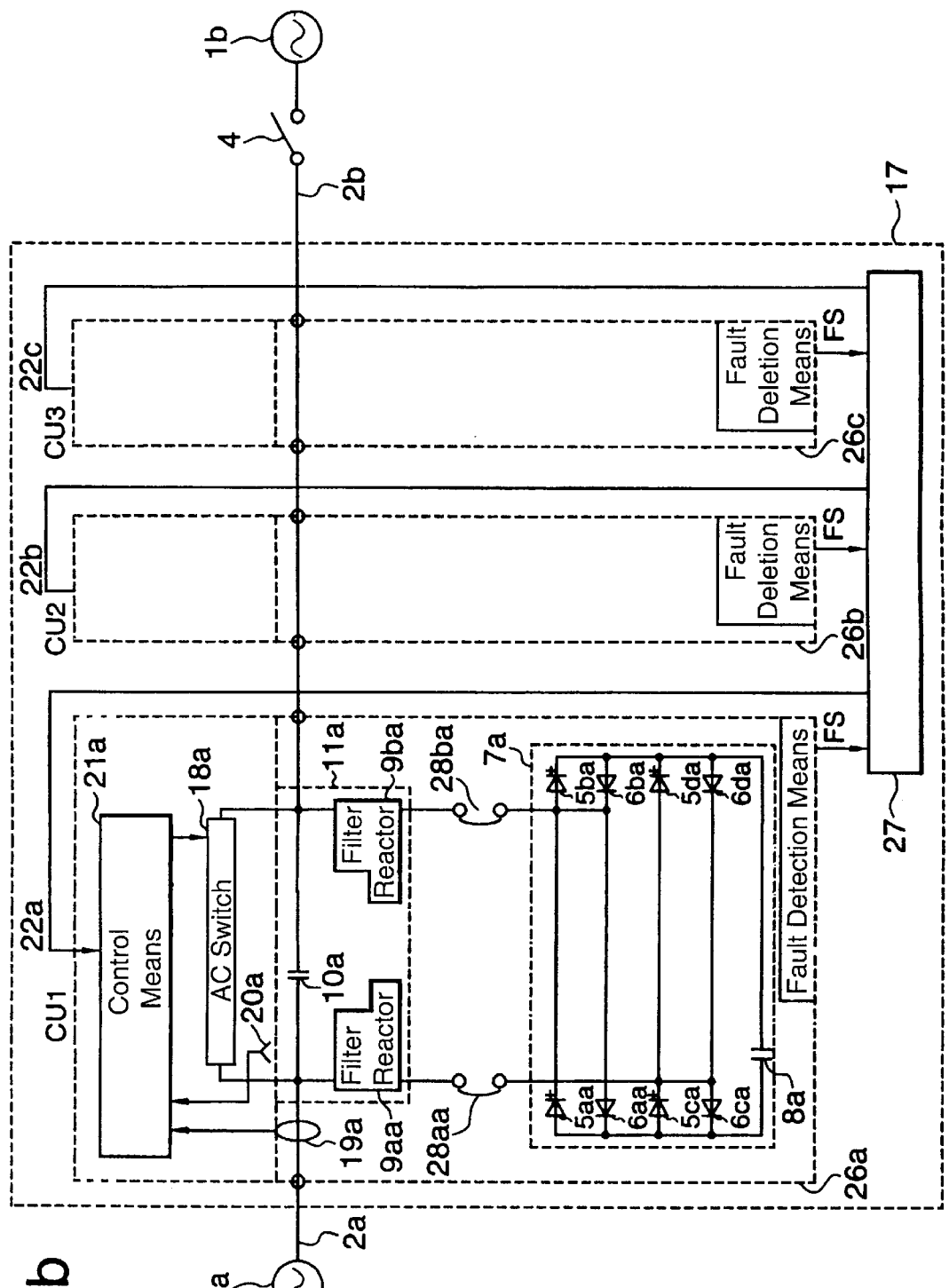

FIG. 7b shows a more concrete circuit diagram of a compensator device 17 comprising several compensator units CU1, CU2, CU3 including a plurality of series compensators 26a, 26b, 26c. The reason for providing three identical compensator units CU1, CU2, CU3 is as follows. Namely, comparatively large compensatable capacity is necessary for the TL-RSC 3. However, rated voltage and rated current of the self arc-suppressing semiconductors 5a to 5d are limited. Therefore, in order to reach the expected compensatable capacity, it is preferred that the inventive compensator device 17 consist of several compensator units CU1, CU2, CU3 connected in series as shown in FIG. 7b. In this illustration, a continuous operation controller 27 receives the status of each of the compensator units CU1, CU2, CU3 and outputs the start-up or shut-down command 22 to each of the compensator units CU1, CU2, CU3 and switches 28aa, 28ba, preferably mechanical ones, connect or disconnect the inverter 7a to the output terminals 3a, 3b via the filter circuit 11a. Of course, the start-up and shut-down operation processes mentioned above apply equally well to each of the compensator units CU1, CU2, CU3 with no alternation.

There are two possible embodiments for connecting the AC switch 18 to the multiple TL-RSC 17. One embodiment is to connect in common only one AC switch 18 across the multiple TL-RSC 17. The other embodiment is to connect an AC switch 18 to each of the compensator units CU, CU2, CU3, as in FIG. 7b. The following discusses a continuous operation for the multiple TL-RSC 17 according to the embodiment shown in FIGS. 7a, 7b, (that means the latter embodiment).

The multiple TL-RSC 17 must continue operating with no interruption as long as possible because it is connected in series to the power transmission lines 2a, 2b. Even if some of the TL-RSCs 26a to 26c have a failure, the multiple TL-RSC 17 should continue operating. Here, it is assumed that the TL-RSC 26a has a failure during normal operation. Before the failure, the line current $I_L$ flows through the single-phase inverter 7a–7b–7c.

When the failure happens, the fault detection means FDM of the single-phase inverter 7a sends a fault signal FS to the continuous operation controller 27 and the continuous operation controller 27 gives the shut-down command 22a to the AC switch controller 21a inside of the TL-RSC 26a. According to the shut-down command 22a, the AC switch 18a is turned on by the AC switch controller 21a at the zero crossing of the AC switch 18a voltage as discussed with reference to FIG. 3. Then, the line current $I_L$, flowing through the single-phase inverter 7a, commutates to the AC switch 18a and the line current $I_L$, and flows through the AC switch 18a of CU1 and through the single-phase inverters 7b–7c of CU2, CU3. Thus, the line current $I_L$ can be still controlled by the TL-RSC 26b, 26c and the multiple TL-RSC 17 also can continue controlling the line current $I_L$.

Furthermore, after all the current flowing through the single-phase inverter 7a is bypassed to the AC switch 18a, the single-phase inverter 7a can be disconnected from the power transmission lines 2a, 2b by controlling the switches 28aa, 28ba and can be repaired. After repairing, the single-phase inverter 7a can be re-connected with the power transmission lines 2a, 2b (of course by then performing the start-up sequence as in FIG. 3 and FIG. 4). Consequently, when a redundancy design is applied to the TL-RSC 26a to 26c, the multiple TL-RSC 17 can continue operating with higher reliability.

Fifth Embodiment

When the single-phase inverter 7a is disconnected from the power transmission lines 2a, 2b by the AC switch 18a, the compensatable capacity of the multiple TL-RSC is decreased. In this case, the line current controller (not shown in FIGS. 7a, 7b) may perform a control such that the output voltage of the single-phase inverters 7b, 7c is increased. However, the output voltage is proportioned to voltages of the DC capacitor 8b, 8c. Normally the voltage is kept constant by a DC voltage controller not shown in FIGS. 7a, 7b so that the compensatable capacity is absolutely limited.

Figure 8:
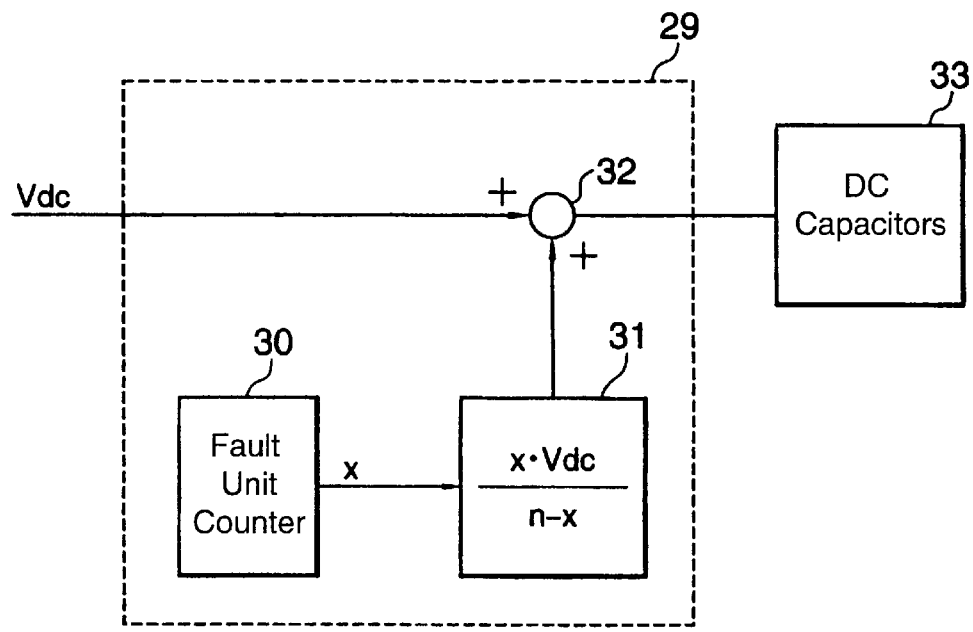
FIG. 8 shows a block diagram of a control means including a DC voltage command regulator.
Figure 9:
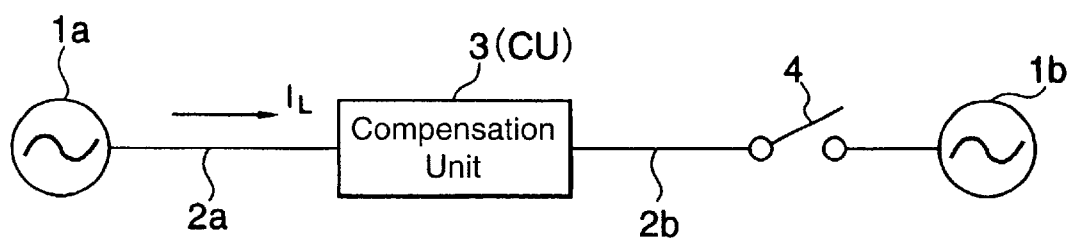
FIG. 9 shows an application of a compensator device according to the prior art.

Another embodiment of the novel multiple TL-RSC 17 according to the invention realizes no reduction of the compensatable capacity. FIG. 8 shows an embodiment of a DC voltage command regulator 29 provided separately for the compensator units CU1, CU2, CU3 in the control means 27. A fault unit counter that counts the number of the TL-RSCs 26 (i.e. 26a, 26b, 26c) having a failure, is designated by 30. The counter 30 can count the number on the basis of the FS signals from the fault detection means FDM. A DC voltage command compensator is designated by 31, an adder is designated by 32, and a DC voltage controller which controls voltages of the DC capacitors 8a to 8c (see FIG. 7b), is designated by 33.

Here, Vdc denotes a DC voltage command without any fault of the TL-RSC unit 26a to 26c. Vdc is issued by a constant voltage source in the control means 27. A case without any failure, an output of the adder 32 is Vdc and the DC voltage command of the DC voltage command regulator 29 is Vdc. In case x units out of the n TL-RST units have a failure, the adder 32 changes the output to Vdc+n·Vdc/(n−x). The output is replaced as the new command of the DC voltage command regulator 29. According to the new command, the voltage of the DC capacitor 8 inside of the steady TL-RSC 26 is increased by the DC voltage controller 33 so as to compensate the output voltage of the TL-RSC 26 having a failure. Consequently, even if some TL-RSC 26 have a failure, the multiple TL-RSC 17 can continue operating with no reduction of the compensatable capacity.

Here, it is assumed that x means the number of faulty TL-RSC units 26. However, such a multiple configuration as shown in FIGS. 7a, 7b is often designed by using one redundancy. Then, the maximum number of x is limited to 1.

Sixth Embodiment

FIG. 2 and FIG. 6 illustrate only the basic embodiments of the AC switch 18 of the invention. In real applications, additional protection circuits may preferably be used. Some conventional protections are useful. For example, anode reactors to limit di/dt when the AC switch 18 is turned on and snubber circuits to limit dV/dt when the AC switch 18 is turned off may be used. In proportion to the voltage of the DC capacitor 8, it is conceivable that the thyristor 25 consists of some thyristors connected in series, namely thyristor valves. The DC voltage command compensator 31 may be equipped with a limiter of a maximum value of the output and/or a limiter of the output rise.

The invention is not limited to the above-described embodiments, which are currently perceived as the best mode of the invention and which only serve the general explanation of the principle of the invention. Within the scope of the invention, as defined in the claims, the compensation device according to the invention can also be realized with other embodiments, which have not been described above. In particular, the compensation device can comprise features which result from a combination of the respective single features of the claims.

What is claimed is:

1. A compensation device comprising:
    a plurality of compensator units, each compensator unit including a transformerless reactive series compensator, the plurality of compensator units being connected in series at output terminals;
    a plurality of AC switches coupled to output terminals of respective series compensators; and
    continuous operation control means for selectively controlling the series compensators, wherein
        the series compensator comprises a single phase inverter connected to the output terminals and including a DC capacitor, and
        the continuous operation control means comprises DC voltage command regulator means for setting a voltage across the DC capacitor.

2. The compensation device according to claim 1, wherein
    the compensator unit comprises fault detection means for detecting a failure of normal operation of a respective series compensator and, in response, sending a fault detection signal to the continuous operation control means, and
    the DC voltage command regulator means comprises a fault counter for counting the number of series compensators that have failed, on the basis of the fault detection signals, wherein the DC voltage command regulator means sets a DC voltage across DC capacitor corresponding to the number of failed compensators.

3. The compensation device according to claim 2, wherein the DC voltage command regulator means comprises
    DC voltage control means;
    DC voltage command compensator means for receiving, as an input, the number of failed series compensators counted by said fault counter and for outputting a DC voltage compensation command corresponding to the number of failed series compensators; and adder means for adding a preset DC voltage command to the DC voltage compensation command and for outputting a DC voltage command compensated according to the number of failed series compensators to the DC voltage control means.

4. The compensation device according to claim 3, wherein the DC voltage command compensator means outputs an output voltage x·Vdc/(n−x), where x is the number of failed series compensators, n is the total number of series compensators, and Vdc is a DC voltage command, the adder means adding the output voltage to the DC voltage command.

5. A compensation device comprising:

at least one compensator unit with a transformerless reactive series compensator including a single phase inverter; and an AC switch coupled to output terminals of the series compensator, the phase inverter also being connected to the output terminals.

6. The compensation device according to claim 5, including a filter circuit, wherein the single phase inverter is connected to the output terminals through the filter circuit.

7. The compensation device according to claim 6, wherein the filter circuit comprises a capacitor connected between the output terminals; and two reactors respectively connected between a respective output terminal and the single phase inverter, wherein in the AC switch is connected in parallel with the capacitor of filter circuit.

8. The compensation device according to claim 5, wherein the single phase inverter comprises self arc-suppressing semiconductor devices and free-wheeling diodes.

9. A compensation device comprising:

a plurality of compensator units, each compensator unit including a transformerless reactive series compensator, the plurality of compensator units being connected in series at output terminals;

a plurality of AC switches coupled to output terminals of respective series compensators; and continuous operation control means for selectively controlling the series compensators, wherein the compensator units comprise fault detection means for detecting a failure of normal operation of a respective series compensator and, in response, sending a fault detection signal to the continuous operation control means.

10. The compensation device according to claim 9, wherein the compensator units comprise:

AC switch control means for turning on the AC switch upon zero-crossing of AC switch voltage across the output terminals, and each of the series compensators comprises a single phase inverter connected to the output terminals, and a switch connecting the single phase inverter to the output terminals, the continuous operation control means sending a shut-down command to the AC switch control means of the compensator unit having a fault detection means that has issued the fault detection signal, wherein the AC switch control means turns on the respective AC switch and disconnects the respective single phase inverter from the output terminals by switching off the switch connecting the single phase inverter to the output terminals.

* * * * *